US011888268B2

(12) United States Patent
Mamuro

(10) Patent No.: US 11,888,268 B2
(45) Date of Patent: Jan. 30, 2024

(54) MULTI-POLE CONNECTOR SET INCLUDING A SHIELD FOR SUPPRESSING ELECTROMAGNETIC WAVE INTERFERENCE

(71) Applicant: Murata Manufacturing Co., Ltd., Kyoto-fu (JP)

(72) Inventor: Minoru Mamuro, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 218 days.

(21) Appl. No.: 17/476,410

(22) Filed: Sep. 15, 2021

(65) Prior Publication Data

US 2022/0006243 A1 Jan. 6, 2022

Related U.S. Application Data

(63) Continuation of application No. PCT/JP2020/017412, filed on Apr. 22, 2020.

(30) Foreign Application Priority Data

Apr. 24, 2019 (JP) ................................ 2019-083476

(51) Int. Cl.
*H01R 12/71* (2011.01)
*H01R 13/6582* (2011.01)
(Continued)

(52) U.S. Cl.
CPC ..... *H01R 13/6582* (2013.01); *H01R 12/7005* (2013.01); *H01R 12/716* (2013.01); *H01R 13/652* (2013.01); *H01R 13/6591* (2013.01)

(58) Field of Classification Search
CPC ............ H01R 13/6582; H01R 12/7005; H01R 12/716; H01R 13/652; H01R 13/6591;
(Continued)

(56) References Cited

U.S. PATENT DOCUMENTS 9,831,579 B1 * 11/2017 Gomelsky .............. H01R 12/52
2013/0005192 A1 * 1/2013 Lim ..................... H01R 12/716 439/660

(Continued)

FOREIGN PATENT DOCUMENTS

CN 103579861 A 2/2014
CN 108258484 A 7/2018

(Continued)

OTHER PUBLICATIONS

International Search Report issued in PCT/JP2020/017412; dated Jun. 23, 2020.

(Continued)

*Primary Examiner* — Abdullah A Riyami
*Assistant Examiner* — Nelson R. Burgos-Guntin
(74) *Attorney, Agent, or Firm* — Studebaker & Brackett PC

(57) ABSTRACT

A multi-pole connector set for suppressing electromagnetic wave interference between inner terminals disposed in the same rows. The multi-pole connector set includes a first connector and a second connector mating with each other. The first connector includes first inner terminals arrayed in a plurality of rows, a first insulating member, and a first shield member located between the rows of the first inner terminals. The second connector includes second inner terminals arrayed in a plurality of rows and a second insulating member. The multi-pole connector set further includes connection parts that connect the first shield member and the second inner terminals to each other.

20 Claims, 18 Drawing Sheets

(51) Int. Cl.

| | |
|---|---|
| ***H01R 12/70*** | (2011.01) |
| ***H01R 13/652*** | (2006.01) |
| ***H01R 13/6591*** | (2011.01) |

(58) Field of Classification Search

CPC ................ H01R 13/20; H01R 13/6585; H01R 13/6594; H01R 12/73

See application file for complete search history.

(56) References Cited

U.S. PATENT DOCUMENTS

| | | | | |
|---|---|---|---|---|
| 2013/0012039 | A1* | 1/2013 | Nose | H01R 12/716 439/74 |
| 2015/0140840 | A1* | 5/2015 | Nishimura | H01R 12/775 439/74 |
| 2016/0064866 | A1 | 3/2016 | Kao et al. | |
| 2016/0294121 | A1 | 10/2016 | Daughtry, Jr. et al. | |
| 2017/0005423 | A1* | 1/2017 | Takenaga | H01R 13/635 |
| 2018/0183189 | A1* | 6/2018 | Chuang | H01R 13/41 |
| 2018/0198241 | A1* | 7/2018 | Ooi | H01R 13/6597 |
| 2019/0214772 | A1* | 7/2019 | Kodama | H01R 13/6582 |
| 2021/0359471 | A1* | 11/2021 | Oosaka | H01R 12/73 |
| 2022/0094112 | A1* | 3/2022 | Kim | H01R 12/707 |
| 2023/0144353 | A1* | 5/2023 | Oh | H01R 12/716 439/74 |

FOREIGN PATENT DOCUMENTS

| | | | |
|---|---|---|---|
| JP | 2012-033439 | A | 2/2012 |
| JP | 2014-093292 | A | 5/2014 |
| JP | 2018-041648 | A | 3/2018 |
| JP | 2018-045992 | A | 3/2018 |
| JP | 2018-116925 | A | 7/2018 |
| JP | 6493611 | B1 | 4/2019 |
| TW | M576347 | U | 4/2019 |
| WO | 2019/021611 | A1 | 1/2019 |

OTHER PUBLICATIONS

International Preliminary Report on Patentability and Written Opinion issued in PCT/JP2020/017412; dated Sep. 28, 2021.

* cited by examiner

MULTI-POLE CONNECTOR SET INCLUDING A SHIELD FOR SUPPRESSING ELECTROMAGNETIC WAVE INTERFERENCE

CROSS-REFERENCE TO RELATED APPLICATIONS

This application claims benefit of priority to International Patent Application No. PCT/JP2020/017412, filed Apr. 22, 2020, and to Japanese Patent Application No. 2019-083476, filed Apr. 24, 2019, the entire contents of each are incorporated herein by reference.

BACKGROUND

Technical Field

The present disclosure relates to a multi-pole connector set formed by inner terminals of a first connector and a second connector connecting to each other.

Background Art

Heretofore, a multi-pole connector set is known that is configured so that a first connector is connected to one circuit board, a second connector is connected to another circuit board, and inner terminals of the first connector and the second connector are connected to each other in order to electrically connect the two circuit boards to each other as described, for example, in International Publication No. 2019/021611.

In the multi-pole connector set of International Publication No. 2019/021611, first inner terminals of the first connector are disposed in two rows. In addition, second inner terminals of the second connector are disposed in two rows.

A shield member is provided between the rows of inner terminals in the multi-pole connector set of International Publication No. 2019/021611. In the multi-pole connector set of International Publication No. 2019/021611, electromagnetic wave interference between inner terminals disposed in different rows is suppressed by the shield member.

SUMMARY

In the multi-pole connector set of International Publication No. 2019/021611, electromagnetic wave interference between inner terminals disposed in different rows is suppressed by the shield member. However, electromagnetic wave interference between inner terminals disposed in the same rows is not adequately suppressed.

Accordingly, the present disclosure provides a multi-pole connector set in which electromagnetic wave interference between inner terminals disposed in the same rows is suppressed. Note that "connector set" refers to a connector set having a large number of terminals.

An embodiment of the present disclosure provides a multi-pole connector set formed by inner terminals of a first connector and a second connector connecting to each other. The first connector includes first inner terminals arrayed in a plurality of rows, a first insulating member that holds the first inner terminals, and a first shield member that is located between the rows of the first inner terminals. The second connector includes second inner terminals arrayed in a plurality of rows, and a second insulating member that holds the second inner terminals. The multi-pole connector set further includes a connection part that connects the first shield member and the first inner terminals or the second inner terminals to each other.

According to the multi-pole connector set of the present disclosure, electromagnetic wave interference between inner terminals disposed in the same rows is suppressed.

DETAILED DESCRIPTION

Hereafter, modes for carrying out the present disclosure will be described together with the drawings.

The embodiments illustrate modes for carrying out the present disclosure in an exemplary manner, and the present disclosure is not limited to the content of the embodiments. In addition, it is possible to combine contents described in different embodiments and the embodiments realized in this way are also included in the present disclosure. In addition, the drawings are to aid in the understanding of the specification and may be drawn in a schematic manner, and the dimensional ratios of the drawn constituent elements or between the drawn constituent elements may not match the corresponding dimensional ratios described in the specification. In addition, constituent elements described in the specification may be omitted from the drawings, may be drawn as being fewer in number, and so forth.

First Embodiment

Figure 1A:
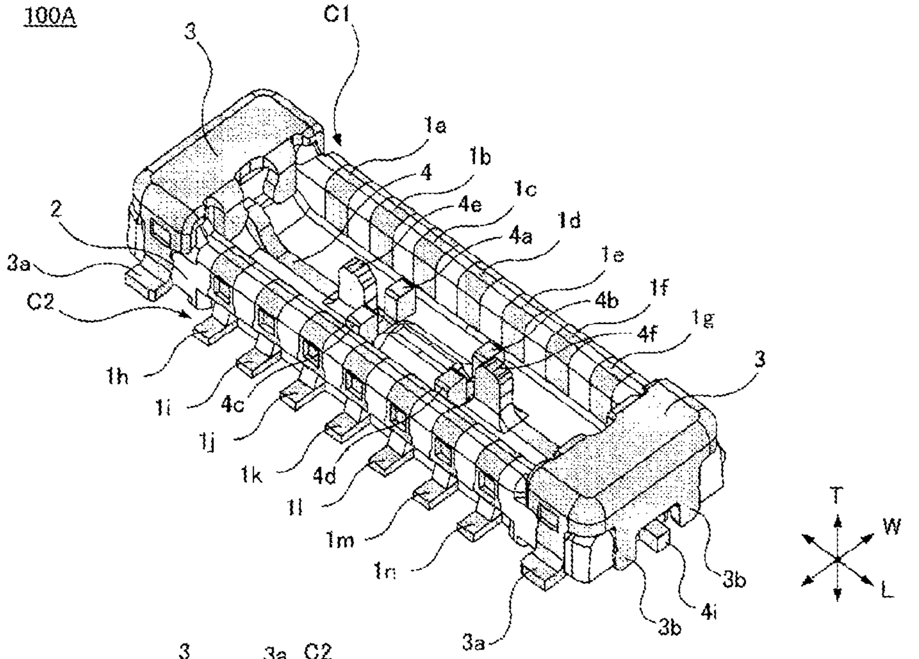
FIG. 1A is a perspective view of a first connector seen from a mating surface side.
Figure 1B:
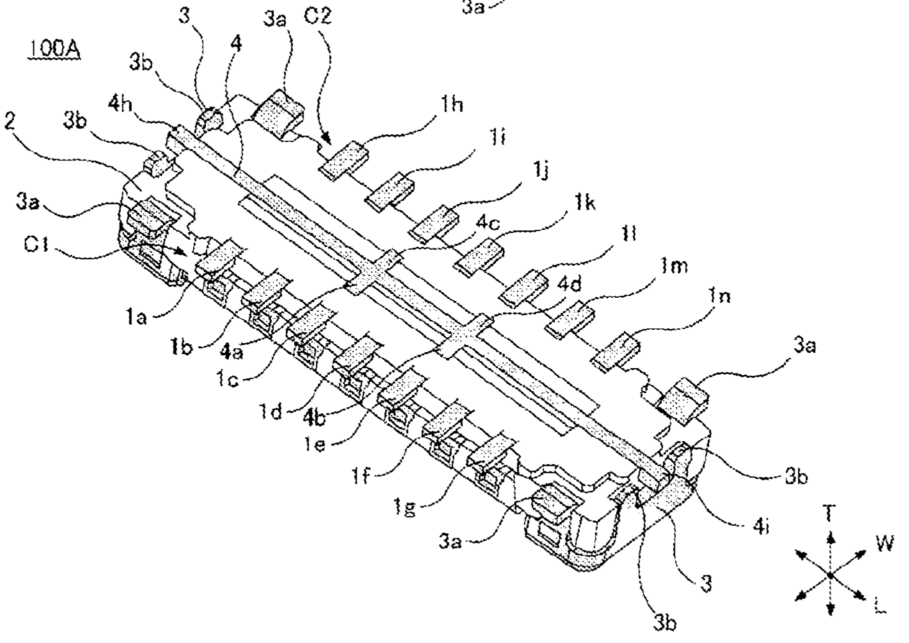
FIG. 1B is a perspective view of the first connector 100A seen from a mounting surface side.
Figure 2:
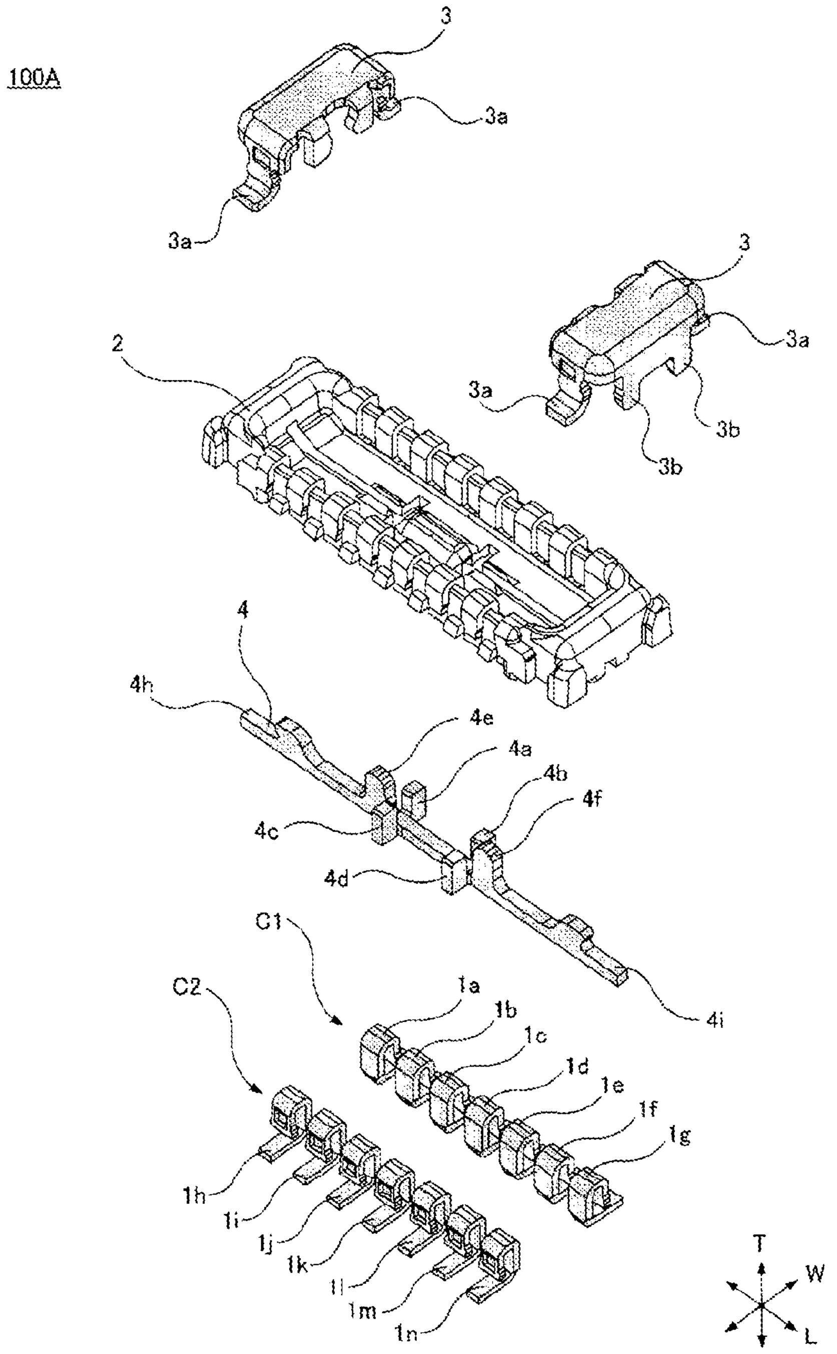
FIG. 2 is an exploded perspective view of the first connector.
Figure 3A:
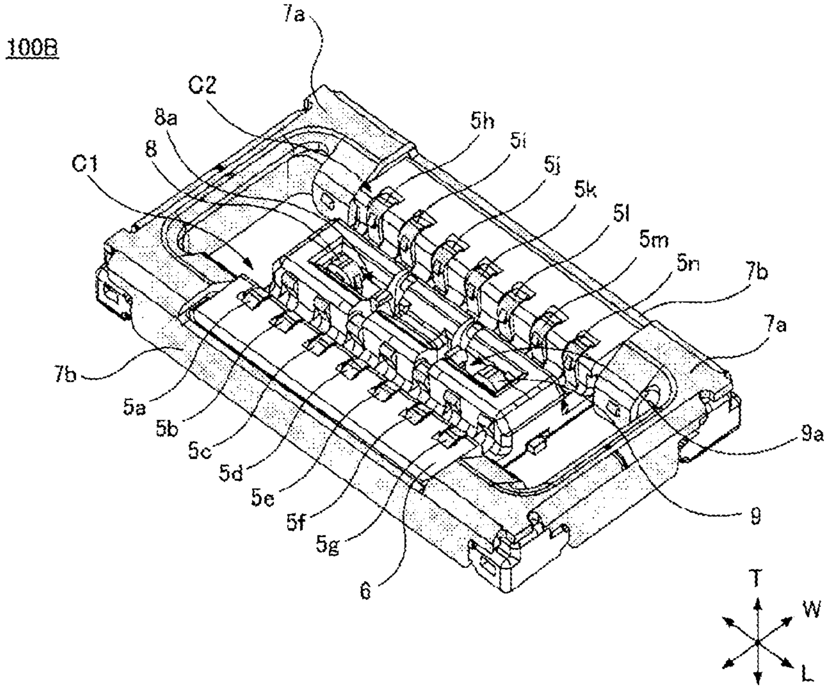
FIG. 3A is a perspective view of a second connector seen from a mating surface side.
Figure 3B:
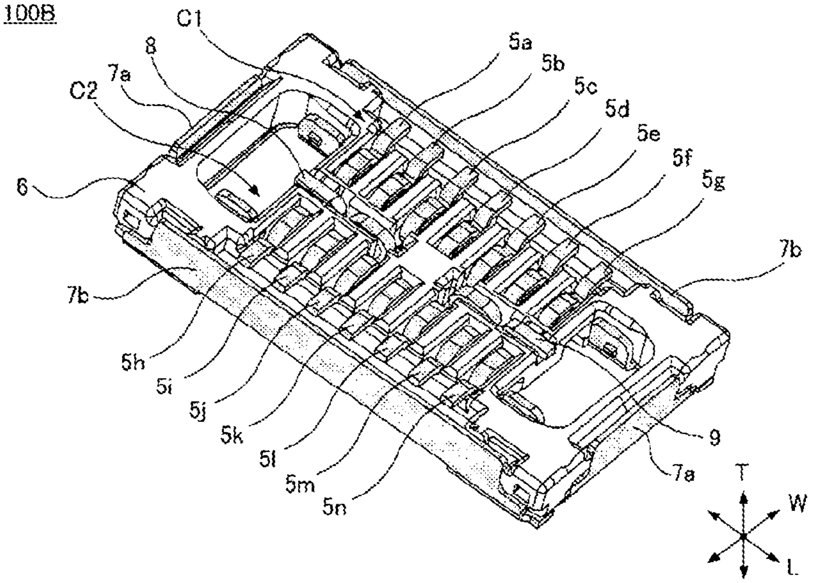
FIG. 3B is a perspective view of the second connector seen from a mounting surface side.
Figure 4:
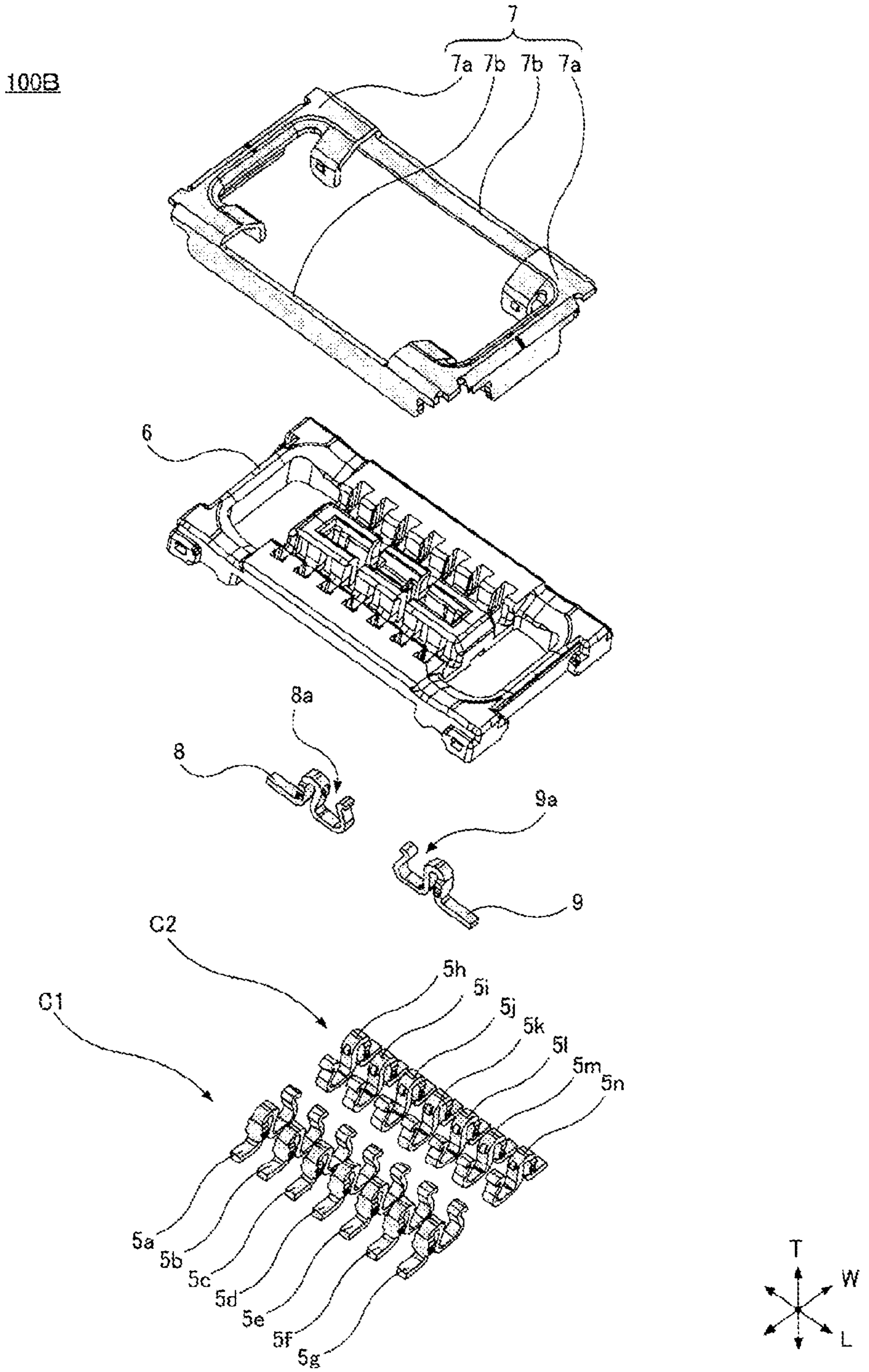
FIG. 4 is an exploded perspective view of the second connector.
Figure 5:
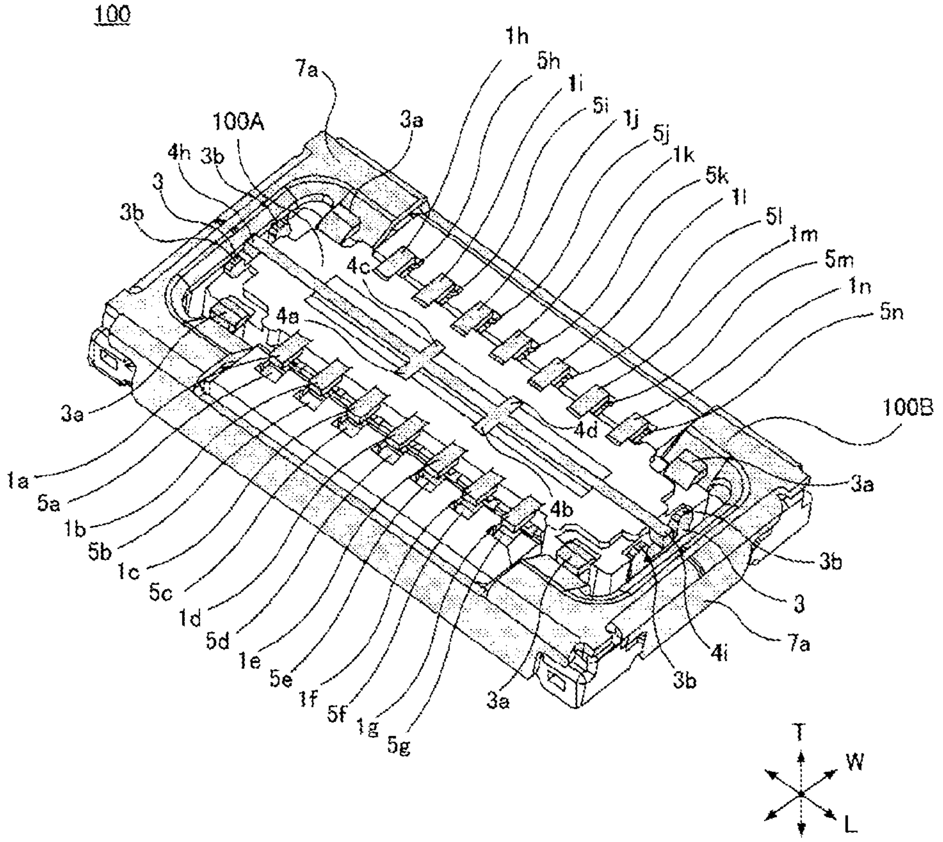
FIG. 5 is a perspective view of a multi-pole connector set.
Figure 6:
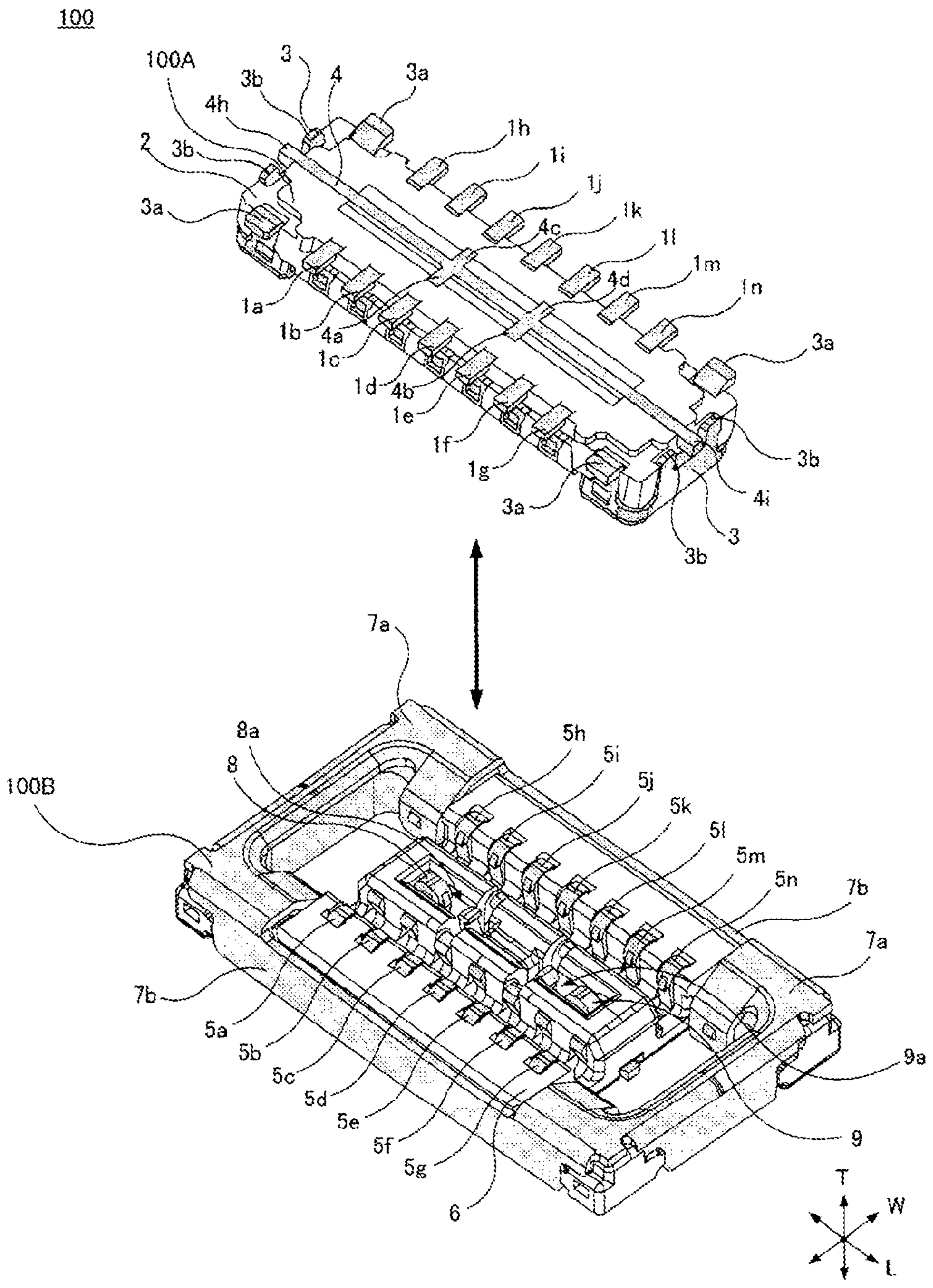
FIG. 6 is a perspective view of the multi-pole connector set with the first connector and the second connector unmated from each other.

FIGS. 1A and 1B, FIG. 2, FIGS. 3A and 3B, FIG. 4, FIG. 5, and FIG. 6 illustrate a multi-pole connector set 100 according to a First Embodiment. The multi-pole connector set 100 is configured so that a first connector 100A and a second connector 100B mate with each other. FIG. 1A is a perspective view of the first connector 100A seen from a mating surface side. FIG. 1B is a perspective view of the first connector 100A seen from a mounting surface side. FIG. 2 is an exploded perspective view of the first connector 100A. FIG. 3A is a perspective view of a second connector 100B seen from a mating surface side. FIG. 3B is a perspective view of the second connector 100B seen from a mounting surface side. FIG. 4 is an exploded perspective view of the second connector 100B. FIG. 5 is a perspective view of the multi-pole connector set 100. FIG. 6 is a perspective view of the multi-pole connector set 100 with the first connector 100A and the second connector 100B unmated from each other.

A height direction T, a length direction L, and a width direction W of the multi-pole connector set 100, the first connector 100A, and the second connector 100B are illustrated in the drawings and these directions may be referred to in the description below. The first connector 100A and the second connector 100B each include a pair of end surfaces that face each other in the length direction L, a pair of side surfaces that face each other in the width direction W, and a pair of main surfaces (a mounting surface and a mating surface) that face each other in the height direction T.

As described above, the multi-pole connector set 100 is configured so that the first connector 100A and the second connector 100B mate with each other. Hereafter, the first connector 100A, the second connector 100B, and the multi-pole connector set 100 will be described in this order.

First Connector 100A

The first connector 100A is illustrated in FIGS. 1A and 1B and FIG. 2.

The first connector 100A includes a plurality of first inner terminals 1*a* to 1*n*. The first inner terminals 1*a* to 1*n* are disposed in two rows, namely, a first row C1 and a second row C2 that extend in the length direction L. Specifically, the first inner terminals 1*a* to 1*g* are disposed in the first row C1 and the first inner terminals 1*h* to 1*n* are disposed in the second row C2.

The first inner terminals 1*a* to 1*n* are connected to signal lines, a ground, and so on of a circuit board or the like on which the first connector 100A is mounted. In this embodiment, the first inner terminals 1*a* to 1*n* are so-called male terminals having a convex shape. However, the first inner terminals 1*a* to 1*n* may instead be so-called female terminals having a concave shape.

The material of the first inner terminals 1*a* to 1*n* is chosen as appropriate, and phosphor bronze can be used, for example. Phosphor bronze is a material that is electrically conductive and elastically deformable.

In this embodiment, the first inner terminals 1*a* to 1*n* are composed of members manufactured by bending and processing metal strips. However, the first inner terminals 1*a* to 1*n* may instead be manufactured by die-cutting a metal member having springiness.

The first connector 100A includes a first insulating member 2. The first insulating member 2 is a member that is for holding the first inner terminals 1*a* to 1*n*. The material of first insulating member 2 is chosen as appropriate, and for example, a resin can be used. The first inner terminals 1*a* to 1*n* are insert molded into the first insulating member 2. However, the first inner terminals 1*a* to 1*n* may instead be fitted and fixed to the first insulating member 2.

The first connector 100A is provided with first outer terminals 3 at both ends of the first insulating member 2.

The first outer terminals 3 are connected to a ground of a circuit board or the like on which the first connector 100A is mounted. The first outer terminals 3 shield the end surfaces of the first connector 100A.

The first outer terminals 3 have a pair of ground mounting parts 3*a* on the sides thereof near the side surfaces of the first connector 100A and have a pair of ground mounting parts 3*b* on the sides thereof near the end surfaces of the first connector 100A. The pair of ground mounting parts 3*a* extend in the same direction as the direction in which the first inner terminals 1*a* to 1*n* extend.

The material of the first outer terminals 3 is chosen as appropriate, and phosphor bronze can be used, for example. The method of manufacturing the first outer terminals 3 is chosen as appropriate, and for example, the first outer terminals 3 can be manufactured by punching and bending a metal plate.

The first outer terminals 3 are insert molded into the first insulating member 2. However, the first outer terminals 3 may instead be fitted and fixed to the first insulating member 2.

In the first connector 100A, a first shield member 4 that extends in the length direction L is provided at a central part of the first insulating member 2 in the width direction W. The first shield member 4 end portions 4*h* and 4*i* at both ends thereof.

The first shield member 4 is provided in order to suppress electromagnetic wave interference between the first inner terminals 1*a* to 1*g* disposed in the first row C1 and the first inner terminals 1*h* to 1*n* disposed in the second row C2.

The end portions 4*h* and 4*i* of first shield member 4 are exposed at the end surfaces of the first connector 100A underneath the first outer terminals 3. As a result, suppression of electromagnetic wave interference between the first inner terminals 1*a* to 1*g* disposed in the first row C1 and the first inner terminals 1*h* to 1*n* disposed in the second row C2 is increased by the first shield member 4.

The end portions 4*h* and 4*i* of the first shield member 4 may be connected to a second outer terminal 7 of the second connector 100B when the first shield member 4 and the second connector 100B are interlocked. In this case, the connection between the first shield member 4 and the ground can be strengthened.

The first shield member 4 has a connection part 4*a* that connects to a second inner terminal 5*c* of the second connector 100B, which will be described later. The connection part 4*a* extends in a direction toward the second inner terminal 5*c* from the first shield member 4 in a state where the first connector 100A and the second connector 100B are mated with each other.

The first shield member 4 has a connection part 4*b* that connects to a second inner terminal 5*e* of the second connector 100B, which will be described later. The connection part 4*b* extends in a direction toward the second inner terminal 5*e* from the first shield member 4 in a state where the first connector 100A and the second connector 100B are mated with each other.

The first shield member 4 has a connection part 4*c* that connects to a second inner terminal 5*j* of the second connector 100B, which will be described later. The connection part 4*c* extends in a direction toward the second inner terminal 5*j* from the first shield member 4 in a state where the first connector 100A and the second connector 100B are mated with each other.

The first shield member 4 has a connection part 4*d* that connects to a second inner terminal 5*l* of the second connector 100B, which will be described later. The connection part 4*d* extends in a direction toward the second inner terminal 5*l* from the first shield member 4 in a state where the first connector 100A and the second connector 100B are mated with each other.

The first shield member 4 is provided with the connection parts 4*a* to 4*d*, which connect the first shield member 4 and the first inner terminals or the second inner terminals to each other, nearer the inside than the ground mounting parts 3*a* and 3*b* of the first outer terminals 3.

The ground mounting parts 3*a* of the first outer terminals 3 are shaped so as to extend outward towards the region outside the first connector 100A and so as to be aligned with the end portions of the first inner terminals 1*a* to 1*n*. Thus, since the first inner terminals 1*a* to 1*n* (except for the first inner terminals 1*c*, 1*e*, 1*j*, and 1*l*) are surrounded up to their end portions by members that are at the ground potential, namely, the pair of first outer terminals 3, the first shield member 4, and the first inner terminals 1*c*, 1*e*, 1*j*, and 1*l*, which are connected to the first shield member 4, electromagnetic wave interference between the first inner terminals 1*a* to 1*n* (except for the first inner terminals 1*c*, 1*e*, 1*j*, and 1*l*) and the outside is further suppressed. In addition, electromagnetic wave interference between the first inner terminals 1*a* to 1*n* (except for the first inner terminals 1*c*, 1*e*, 1*j*, and 1*l*) and the outside is further suppressed by providing the ground mounting parts 3*b* between the ground mounting parts 3*a* and the first shield member 4 in the width direction W.

In addition, the first shield member 4 has a protrusion 4*e* that mates with a recess 8*a* of a second shield member 8 of the second connector 100B that will be described later.

The first shield member 4 has a protrusion 4*f* that mates with a recess 9*a* of a second shield member 9 of the second connector 100B that will be described later.

The material of the first shield member 4 is chosen as appropriate, and phosphor bronze can be used, for example.

The first shield member 4 of this embodiment is manufactured by punching and bending a metal plate. However, the first shield member 4 may instead be manufactured by joining together a plurality of members.

The first shield member 4 is insert molded into the first insulating member 2. However, the first shield member 4 may instead be fitted and fixed to the first insulating member 2.

The first connector 100A can be manufactured using an existing generally used connector manufacturing method.

Second Connector 100B

The second connector 100B is illustrated in FIGS. 3A and 3B and FIG. 4.

The second connector 100B includes a plurality of second inner terminals 5*a* to 5*n*. The second inner terminals 5*a* to 5*n* are disposed in two rows, namely, a first row C1 and a second row C2 that extend in the length direction L. Specifically, the second inner terminals 5*a* to 5*g* are disposed in the first row C1 and the second inner terminals 5*h* to 5*n* are disposed in the second row C2.

The second inner terminals 5*a* to 5*n* are connected to signal lines, a ground, and so on of the circuit board or the like on which the second connector 100B is mounted. In this embodiment, the second inner terminals 5*a* to 5*n* are so-called female terminals. However, the second inner terminals 5*a* to 5*n* may instead be so-called male terminals.

The material of the second inner terminals 5*a* to 5*n* is chosen as appropriate, and phosphor bronze can be used, for example.

In this embodiment, the second inner terminals 5*a* to 5*n* are composed of members manufactured by bending and processing metal strips. However, the second inner terminals 5*a* to 5*n* may instead be manufactured by die-cutting a metal member having springiness.

The second connector 100B includes a second insulating member 6. The second insulating member 6 is a member that is for holding the second inner terminals 5*a* to 5*n*. The material of second insulating member 6 is chosen as appropriate, and for example, a resin can be used. The second inner terminals 5*a* to 5*n* are insert molded into the second insulating member 6. However, the second inner terminals 5*a* to 5*n* may instead be fitted and fixed to the second insulating member 6.

The second connector 100B includes a second outer terminal 7 held by the second insulating member 6. The second outer terminal 7 has a pair of body parts 7*a* that are disposed at both ends of the first insulating member 2 and a pair of side wall parts (side shields) 7*b* that extend in the length direction L and connect the pair of body parts 7*a* to each other.

The second outer terminal 7 is connected to a ground of a circuit board or the like on which the second connector 100B is mounted. The body parts 7*a* shield the end surfaces of the second connector 100B. The side wall parts 7*b* shield the side surfaces of the second connector 100B.

The material of the second outer terminal 7 is chosen as appropriate, and phosphor bronze can be used, for example.

The second outer terminal 7 of this embodiment is basically manufactured by punching and bending a metal plate. However, the body parts 7*a* and the side wall parts 7*b* of the second outer terminal 7 may instead be manufactured separately and then joined together.

The second outer terminal 7 is insert molded into the second insulating member 6. However, the second outer terminal may instead be fitted and fixed to the second insulating member 6.

In the second connector 100B, two second shield members 8 and 9 that extend in the length direction L are provided at a central part of the second insulating member 6 in the width direction W.

The second shield members 8 and 9 are provided in order to suppress electromagnetic wave interference between the second inner terminals 5*a* to 5*g* disposed in the first row C1 and the second inner terminals 5*h* to 5*n* disposed in the second row C2.

The second shield member 8 includes the recess 8*a* that mates with the protrusion 4*e* of the first shield member 4 of the first connector 100A.

The second shield member 9 includes the recess 9*a* that mates with the protrusion 4*f* of the first shield member 4 of the first connector 100A.

The material of the second shield members 8 and 9 is chosen as appropriate, and phosphor bronze can be used, for example.

In this embodiment, the second shield members 8 and 9 are composed of members manufactured by bending and processing metal strips. However, the second shield members 8 and 9 may instead be manufactured by die-cutting a metal member having springiness.

The second shield members 8 and 9 are insert molded into the second insulating member 6. However, the second shield members 8 and 9 may instead be fitted and fixed to the second insulating member 6.

The second connector 100B can be manufactured using an existing generally used connector manufacturing method.

Multi-Pole Connector Set 100

The multi-pole connector set 100 is formed by the first connector 100A and the second connector 100B mating with each other. FIG. 5 illustrates a perspective view of the multi-pole connector set 100 with the first connector 100A and the second connector 100B mated with each other. FIG. 6 illustrates a perspective view of the multi-pole connector set 100 with the first connector 100A and the second connector 100B unmated from each other.

In a state where the first connector 100A and the second connector 100B of the multi-pole connector set 100 are mated with each other, the first inner terminals 1*a* to 1*n* and the second inner terminals 5*a* to 5*n* are respectively connected to each other. The first inner terminals 1*a* to 1*n* and the second inner terminals 5*a* to 5*n* having the same letters of the alphabet included in the symbols thereof, such as the first inner terminal 1*a* and the second inner terminal 5*a*, are connected to each other.

In addition, in the multi-pole connector set 100, in a state where the first connector 100A and the second connector 100B are mated with each other, the first outer terminals 3 and the body parts 7*a* of the second outer terminal 7 are connected to each other.

Figure 7:
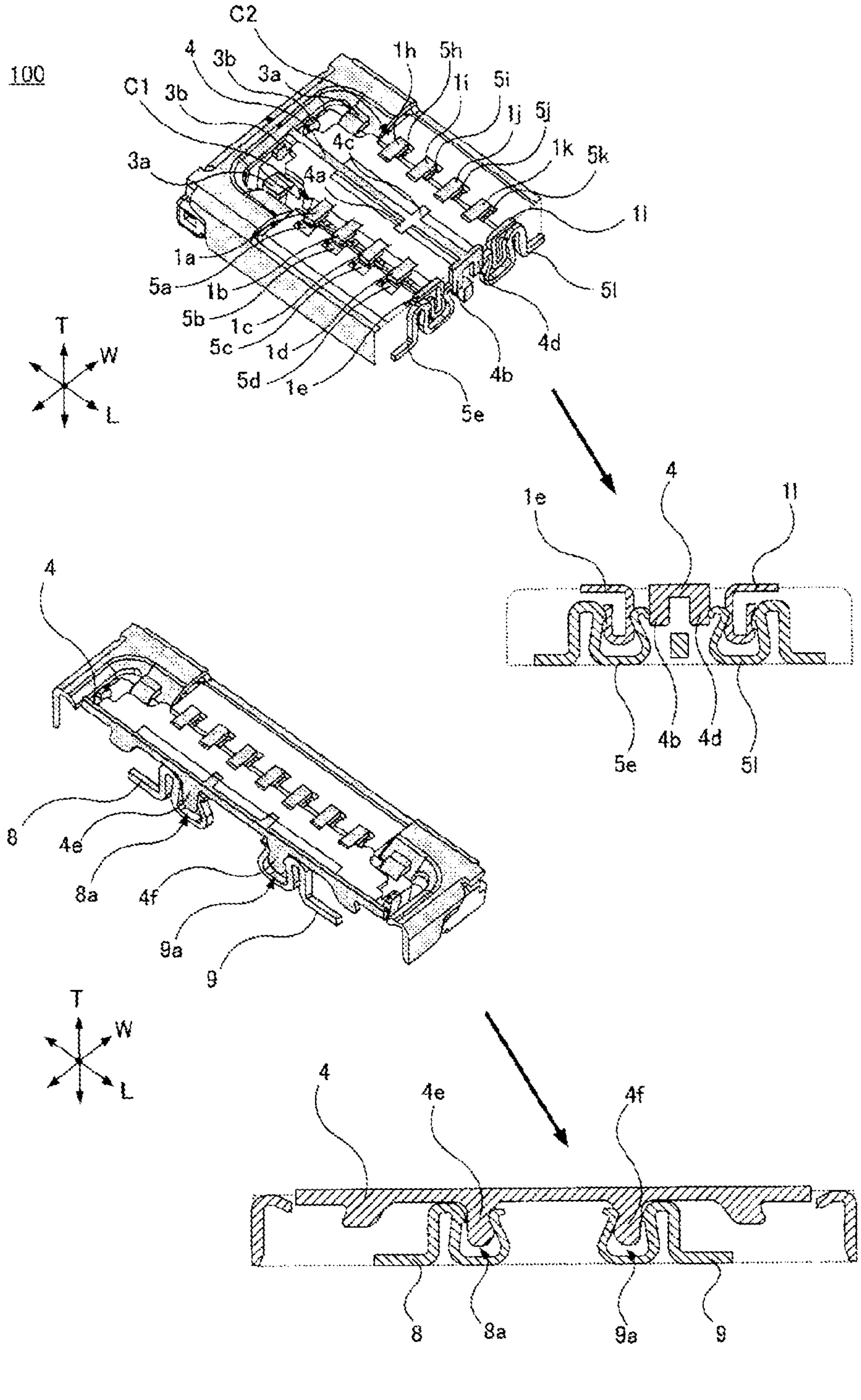
FIG. 7 depicts a sectional view in which the multi-pole connector set is divided along a width direction, an important part sectional view in which the multi-pole connector set is divided along the width direction, a sectional perspective view in which the multi-pole connector set is divided along a length direction, and an important part sectional view in which the multi-pole connector set is divided along the length direction.

In addition, as illustrated in FIG. 7, in the state where the first connector 100A and the second connector 100B of the multi-pole connector set 100 are mated with each other, the connection part 4*a* of the first shield member 4 is connected to the second inner terminal 5*c*, the connection part 4*b* of the first shield member 4 is connected to the second inner terminal 5*e*, the connection part 4*c* of the first shield member 4 is connected to the second inner terminal 5*j*, and the connection part 4*d* of the first shield member 4 is connected to the second inner terminal 5*l*.

More specifically, when the first connector 100A and the second connector 100B are mated with each other, the second inner terminal 5*c* presses against the connection part 4*a* from both sides, the second inner terminal 5*e* presses against the connection part 4*b* from both sides, the second inner terminal 5*j* presses against the connection part 4*c* from both sides, and the second inner terminal 5*l* presses against the connection part 4*d* from both sides.

In other words, when the first connector 100A and the second connector 100B are mated with each other, the connection point between the connection part 4*a* and the second inner terminal 5*c* and the connection point between the first inner terminal 1*c* and the second inner terminal 5*c* are lined up in a direction in which the second inner terminal 5*c* extends. The connection point between the connection part 4*b* and the second inner terminal 5*e* and the connection point between the first inner terminal 1*e* and the second inner terminal 5*e* are lined up in the direction in which the second inner terminal 5*e* extends. The connection point between the connection part 4*c* and the second inner terminal 5*j* and the connection point between the first inner terminal 1*j* and the second inner terminal 5*j* are lined up in the direction in which the second inner terminal 5*j* extends. The connection point between the connection part 4*d* and the second inner terminal 5*l* and the connection point between the first inner terminal 1*l* and the second inner terminal 5*l* are lined up in the direction in which the second inner terminal 5*l* extends.

The second inner terminal 5*c* is connected to the connection part 4*a* of the first shield member 4 and consequently is at the ground potential along with the first inner terminal 1*c*, and realizes a shielding effect. The second inner terminal 5*c* and the first inner terminal 1*c* suppress electromagnetic wave interference between the first inner terminal 1*b* and the second inner terminal Sb and the first inner terminal 1*d* and the second inner terminal 5*d*, which are disposed in the same first row C1. The second inner terminal 5*c* and the first inner terminal 1*c* are also both preferably connected to ground.

The second inner terminal 5*e* is connected to the connection part 4*b* of the first shield member 4 and consequently is at the ground potential along with the first inner terminal 1*e*, and realizes a shielding effect. The second inner terminal 5*e* and the first inner terminal 1*e* suppress electromagnetic wave interference between the first inner terminal 1*d* and the second inner terminal 5*d* and the first inner terminal if and the second inner terminal 5*f*, which are disposed in the same first row C1. The second inner terminal 5*e* and the first inner terminal 1*e* are also both preferably connected to ground.

The second inner terminal 5*j* is connected to the connection part 4*c* of the first shield member 4 and consequently is at the ground potential along with the first inner terminal 1*j*, and realizes a shielding effect. The second inner terminal 5*j* and the first inner terminal 1*j* suppress electromagnetic wave interference between the first inner terminal 1*i* and the second inner terminal 5*i* and the first inner terminal 1*k* and the second inner terminal 5*k*, which are disposed in the same second row C2. The second inner terminal 5*j* and the first inner terminal 1*j* are also both preferably connected to ground.

The second inner terminal 5*l* is connected to the connection part 4*d* of the first shield member 4 and consequently is at the ground potential along with the first inner terminal 1*l*, and realizes a shielding effect. The second inner terminal 5*l* and the first inner terminal 1*l* suppress electromagnetic wave interference between the first inner terminal 1*k* and the second inner terminal 5*k* and the first inner terminal 1*m* and the second inner terminal 5*m*, which are disposed in the same second row C2. The second inner terminal 5*l* and the first inner terminal 1*l* are also both preferably connected to ground.

As described above, in the multi-pole connector set 100, since the first shield member 4 is connected to the second inner terminals 5*c*, 5*e*, 5*j*, and 5*l* in the state where the first connector 100A and the second connector 100B are mated with each other, electromagnetic wave interference between inner terminals disposed in the same rows is suppressed.

Furthermore, in the multi-pole connector set 100, as illustrated in FIG. 7, in the state where the first connector 100A and the second connector 100B are mated with each other, the protrusion 4*e* of the first shield member 4 is mated with the recess 8*a* of the second shield member 8 and the protrusion 4*f* of the first shield member 4 is mated with the recess 9*a* of the second shield member 9. As a result, the first shield member 4 and the second shield member 8 are connected to each other and the first shield member 4 and the second shield member 9 are connected to each other.

Figure 8:
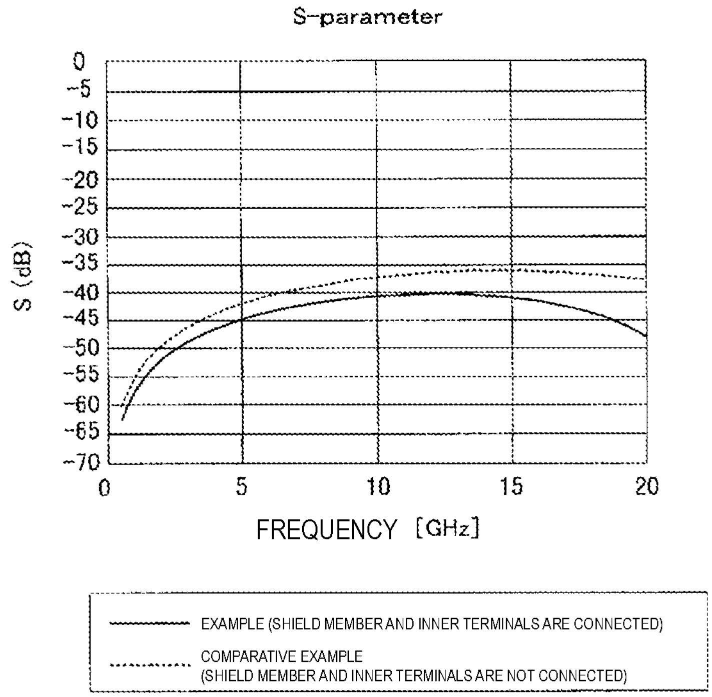
FIG. 8 depicts a graph illustrating the isolation characteristics of an example and a comparative example.

The isolation characteristics of an example in which the first shield member 4 is connected to the second inner terminals 5*c*, 5*e*, 5*j*, and 5*l* and a comparative example in which the first shield member 4 is not connected to the second inner terminals 5*c*, 5*e*, 5*j*, and 5*l* are illustrated in FIG. 8. It is clear from FIG. 8 that the isolation characteristics are improved in the example in which the first shield member 4 is connected to the second inner terminals 5*c*, 5*e*, 5*j*, and 5*l* compared with the comparative example in which the first shield member 4 is not connected to the second inner terminals 5*c*, 5*e*, 5*j*, and 5*l*.

Second Embodiment

Figure 9:
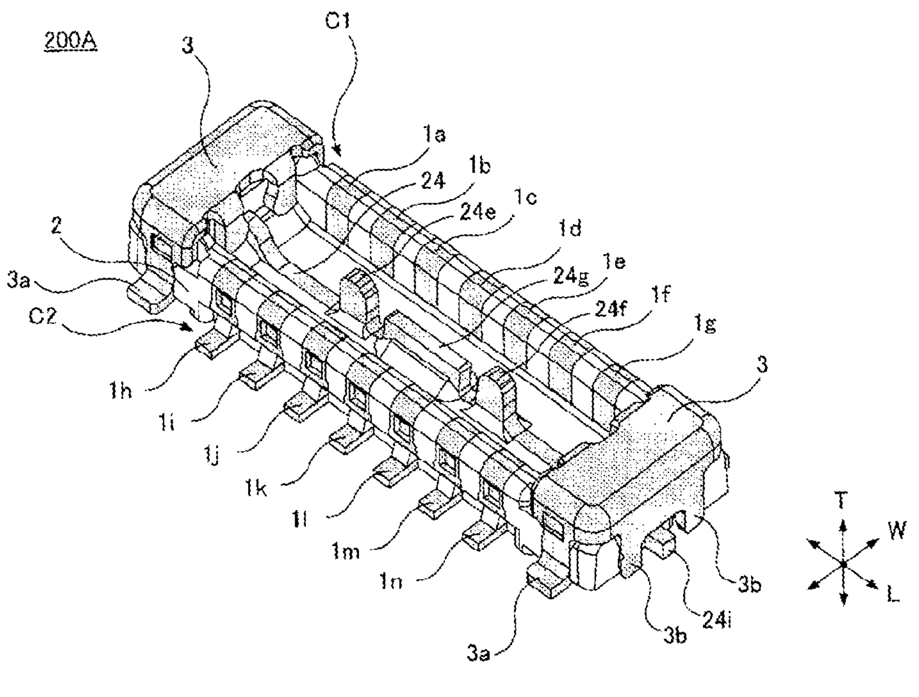
FIG. 9 is a perspective view of a first connector seen from a mating surface side.
Figure 10:
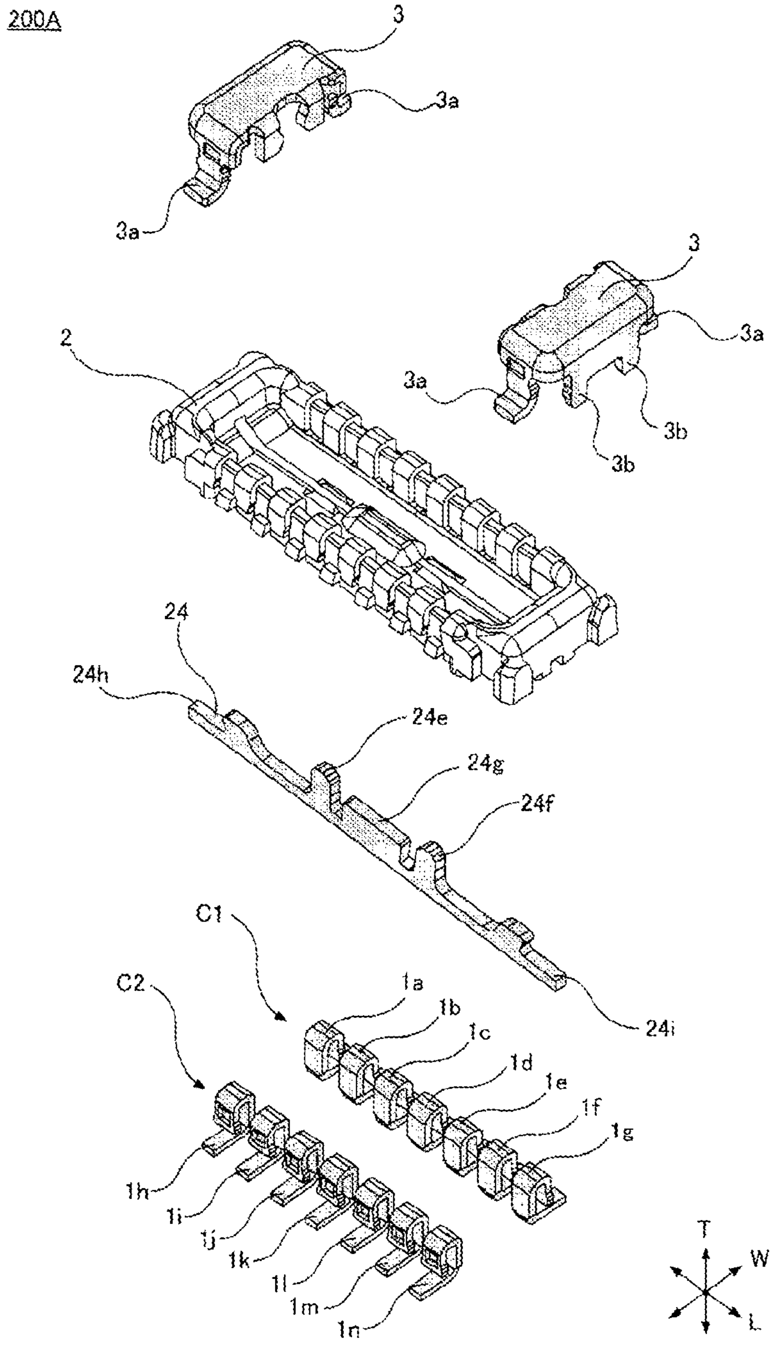
FIG. 10 is an exploded perspective view of the first connector.
Figure 11:
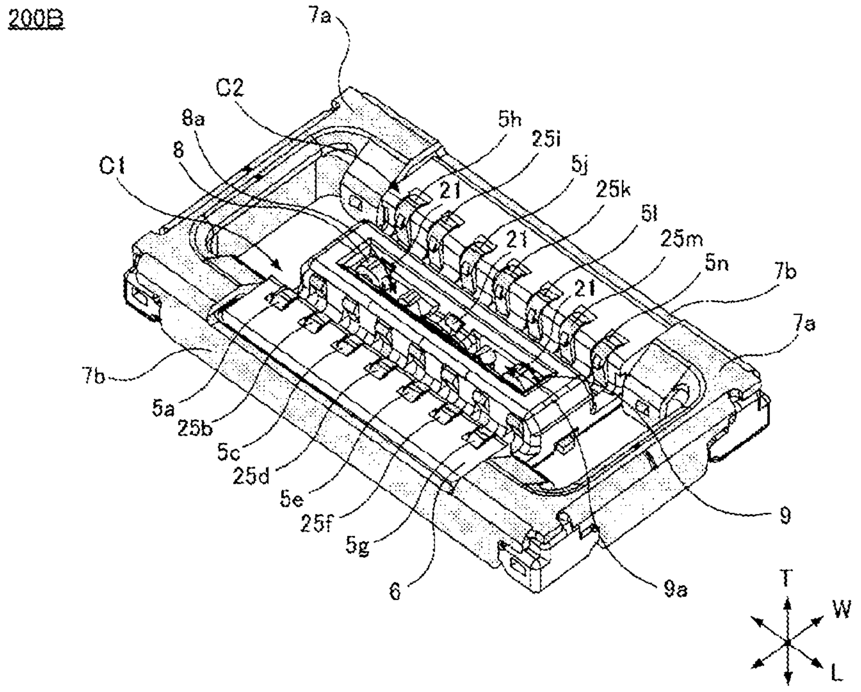
FIG. 11 is a perspective view of a second connector seen from a mating surface side.
Figure 12:
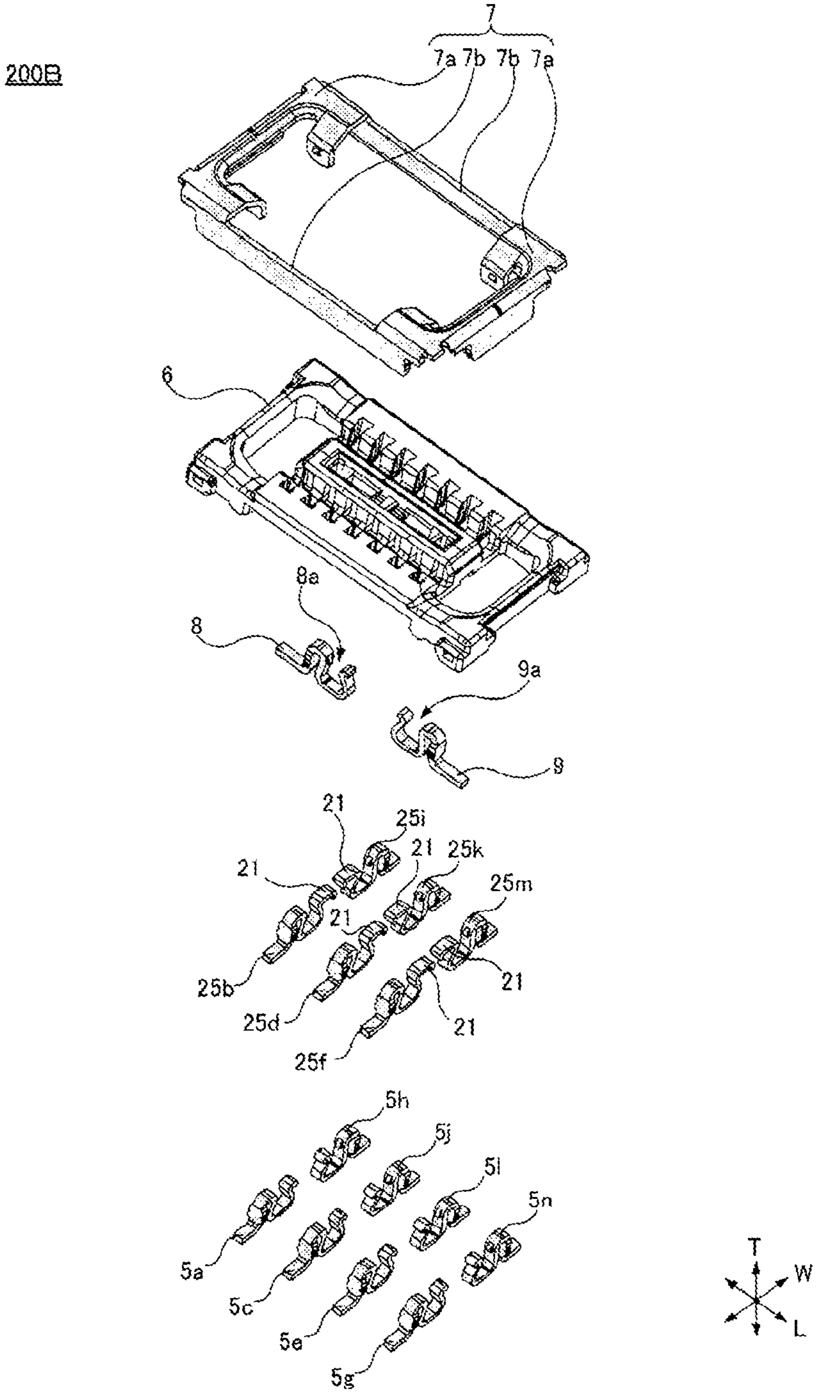
FIG. 12 is an exploded perspective view of the second connector.
Figure 13:
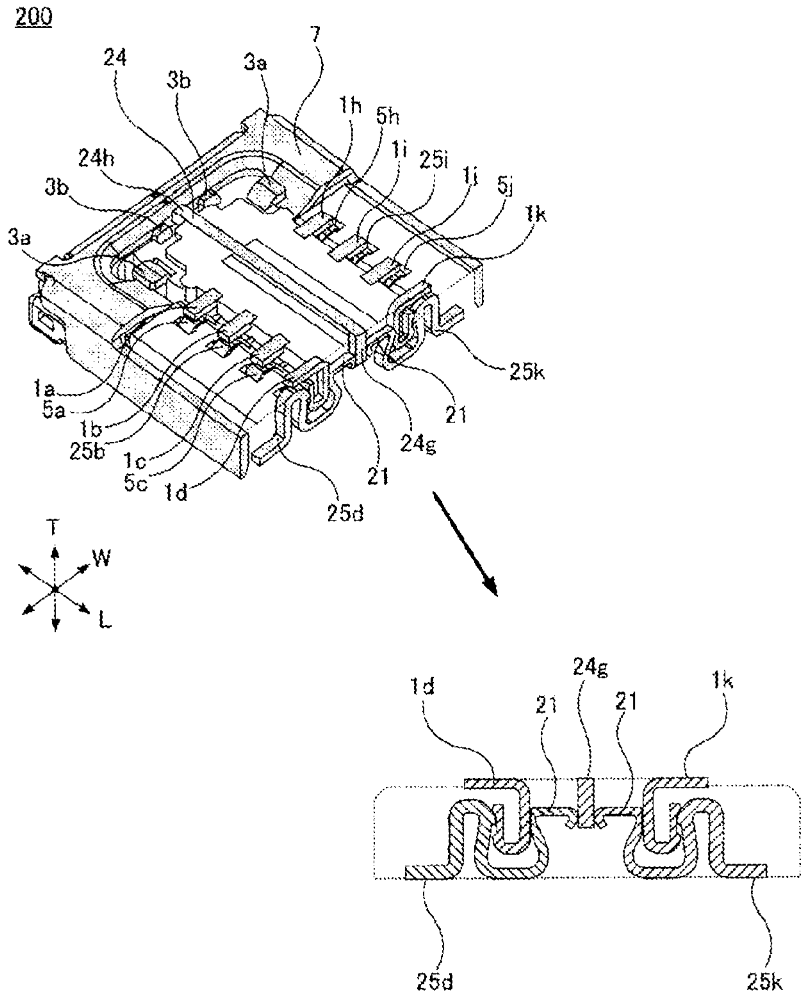
FIG. 13 depicts a sectional perspective view and an important part sectional view in which a multi-pole connector set is divided along the width direction.

A multi-pole connector set 200 according to a Second Embodiment is illustrated in FIGS. 9 to 13. The multi-pole connector set 200 is configured so that a first connector 200A and a second connector 200B mate with each other. FIG. 9 is a perspective view of the first connector 200A seen from a mating surface side. FIG. 10 is an exploded perspective view of the first connector 200A. FIG. 11 is a perspective view of the second connector 200B seen from a mating surface side. FIG. 12 is an exploded perspective view of the second connector 200B. FIG. 13 depicts a sectional perspective view and an important part sectional view in which the multi-pole connector set 200 is divided along the width direction W.

The multi-pole connector set 200 according to the Second Embodiment has a configuration obtained by changing parts of the configuration of the multi-pole connector set 100 according to the First Embodiment. Specifically, in the multi-pole connector set 100, the connection parts 4*a* to 4*d* are formed on the first shield member 4, the connection part 4*a* is connected to the second inner terminal 5*c*, the connection part 4*b* is connected to the second inner terminal 5*e*, the connection part 4*c* is connected to the second inner terminal 5*j*, and the connection part 4*d* is connected to the second inner terminal 5*l*. In the multi-pole connector set 200, this is changed and connection parts are formed on the second inner terminals and the formed connection parts are connected to a first shield member 24.

In the multi-pole connector set 200, the connection parts 4*a* to 4*d* formed on the first shield member 4 of the multi-pole connector set 100 are omitted from the first shield member 24, and a connection plate 24*g* is formed instead.

In addition, in the multi-pole connector set 200, second inner terminals 25*b*, 25*d*, 25*f*, 25*i*, 25*k*, and 25*m* having different shapes are used instead of the second inner terminals 5*b*, 5*d*, 5*f*, 5*i*, 5*k*, and 5*m* of the multi-pole connector set 100. Connection parts 21, which are for connecting to the connection plate 24*g* of the first shield member 24, are formed at the tips of the second inner terminals 25*b*, 25*d*, 25*f*, 25*i*, 25*k*, and 25*m*.

In the multi-pole connector set 200, in the state in which the first connector 200A and the second connector 200B are mated with each other, the connection part 21 of the second inner terminal 25*b*, the connection part 21 of the second inner terminal 25*d*, the connection part 21 of the second inner terminal 25*f*, the connection part 21 of the second inner terminal 25*i*, the connection part 21 of the second inner terminal 25*k*, and the connection part 21 of the second inner terminal 25*m* are connected to the connection plate 24*g* of the first shield member 24.

In the multi-pole connector set 200 as well, since the first shield member 24 is connected to the second inner terminals 25*b*, 25*d*, 25*f*, 25*i*, 25*k*, and 25*m*, electromagnetic wave interference between inner terminals disposed in the same rows is suppressed.

Third Embodiment

Figure 14:
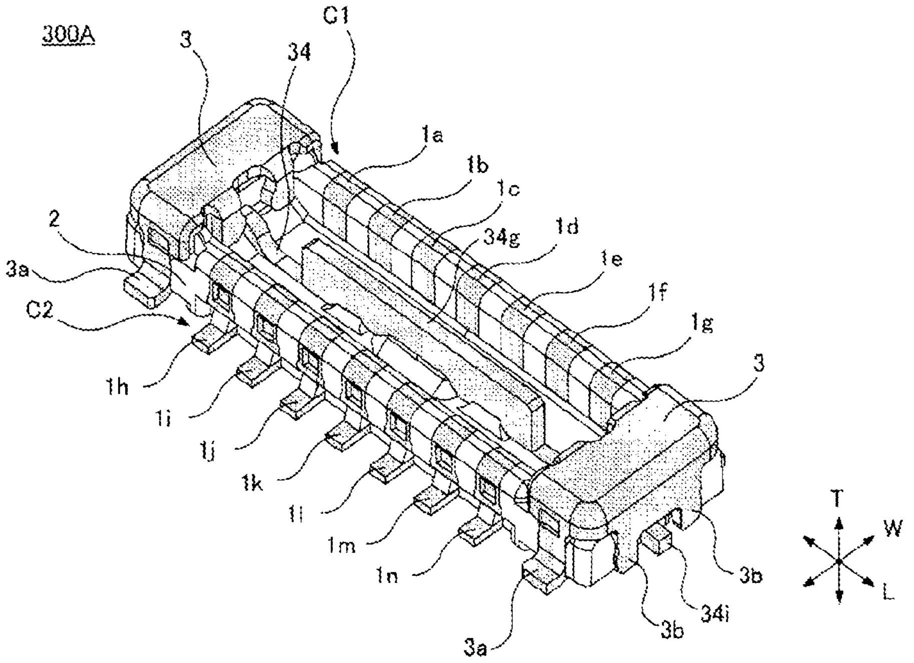
FIG. 14 is a perspective view of a first connector seen from a mating surface side.
Figure 15:
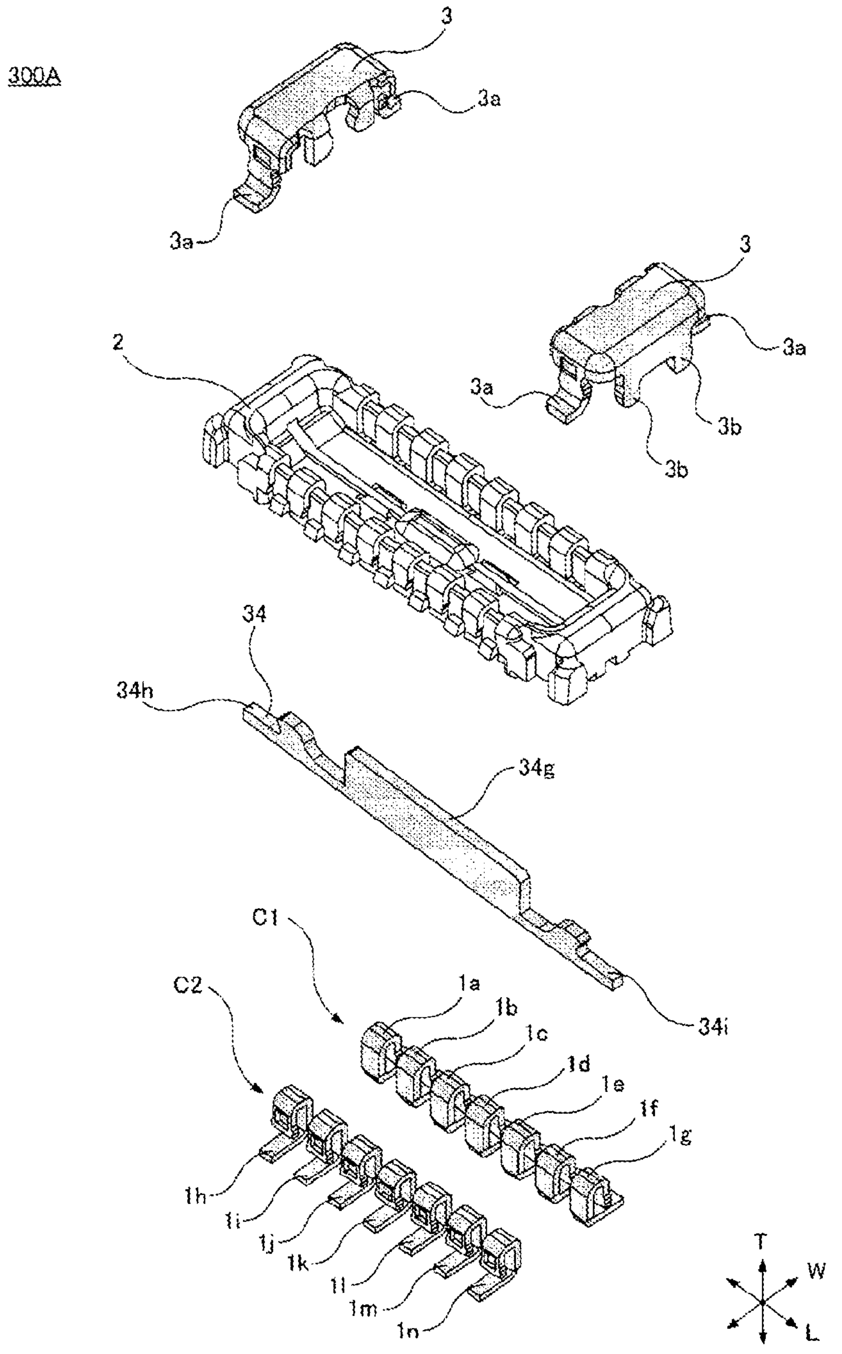
FIG. 15 is an exploded perspective view of the first connector.
Figure 16:
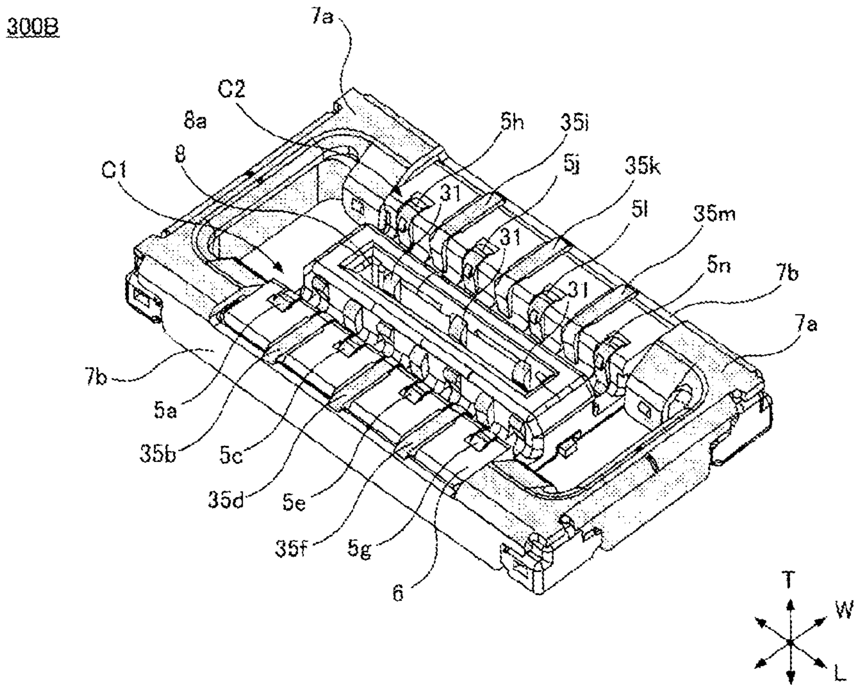
FIG. 16 is a perspective view of a second connector seen from a mating surface side.
Figure 17:
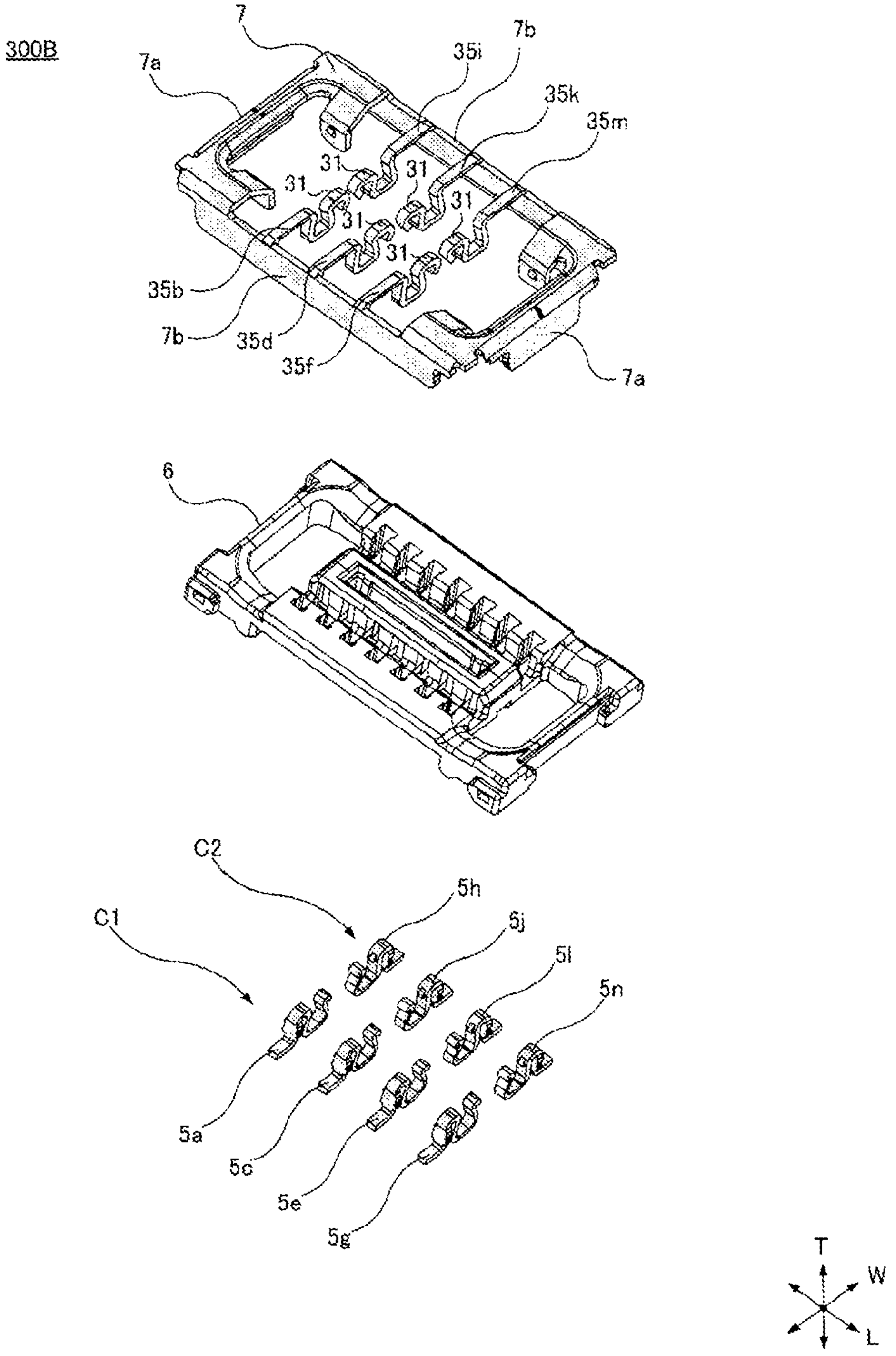
FIG. 17 is an exploded perspective view of the second connector.
Figure 18:
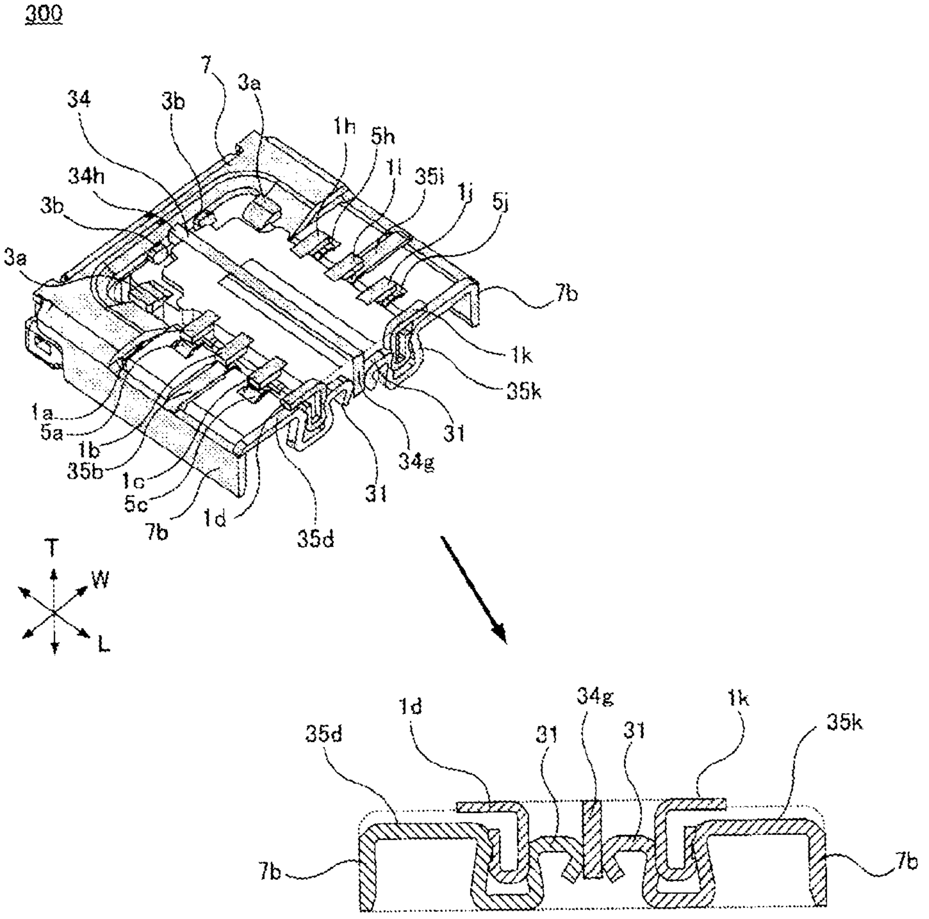
FIG. 18 depicts a sectional perspective view and an important part sectional view in which a multi-pole connector set is divided along the width direction.

A multi-pole connector set 300 according to a Third Embodiment is illustrated in FIGS. 14 to 18. The multi-pole connector set 300 is configured so that a first connector 300A and a second connector 300B mate with each other. FIG. 14 is a perspective view of the first connector 300A seen from a mating surface side. FIG. 15 is an exploded perspective view of the first connector 300A. FIG. 16 is a perspective view of the second connector 300B seen from a mating surface side. FIG. 17 is an exploded perspective view of the second connector 300B. FIG. 18 depicts a sectional perspective view and an important part sectional view in which the multi-pole connector set 300 is divided along the width direction W.

The multi-pole connector set 300 according to the Third Embodiment has a configuration obtained by making further changes to the configuration of the multi-pole connector set 200 according to the Second Embodiment. Specifically, in the multi-pole connector set 200, the second inner terminals 25*b*, 25*d*, 25*f*, 25*i*, 25*k*, and 25*m* are not connected to the second outer terminal 7. In the multi-pole connector set 300, second inner terminals 35*b*, 35*d*, 35*f*, 35*i*, 35*k*, and 35*m* that are connected to the side wall parts 7*b* of the second outer terminal 7 are used instead of the second inner terminals 25*b*, 25*d*, 25*f*, 25*i*, 25*k*, and 25*m* of the multi-pole connector set 200. Connection parts 31 are formed at the tips of the second inner terminals 35*b*, 35*d*, 35*f*, 35*i*, 35*k*, and 35*m*.

In addition, the second shield members 8 and 9 are omitted from the second connector 300B in the multi-pole connector set 300. Furthermore, in the multi-pole connector set 300, the protrusion 4*e* and 4*f* are omitted and a first shield member 34 in which a larger connection plate 34*g* is formed is used in the first connector 300A.

In the multi-pole connector set 300, in the state in which the first connector 300A and the second connector 300B are mated with each other, the connection part 31 of the second inner terminal 35*b*, the connection part 31 of the second inner terminal 35*d*, the connection part 31 of the second inner terminal 35*f*, the connection part 31 of the second inner terminal 35*i*, the connection part 31 of the second inner terminal 35*k*, and the connection part 31 of the second inner terminal 35*m* are connected to the connection plate 34*g* of the first shield member 34.

Since the first shield member 34 is connected to the second inner terminals 35*b*, 35*d*, 35*f*, 35*i*, 35*k*, and 35*m*, electromagnetic wave interference between inner terminals disposed in the same rows is suppressed in the multi-pole connector set 300.

In addition, in the multi-pole connector set 300, the second inner terminals 35*b*, 35*d*, 35*f*, 35*i*, 35*k*, and 35*m* are connected to the second outer terminal 7 and the first shield member 34, the first inner terminals 1*b*, 1*d*, 1*f*, 1*i*, 1*k*, and 1*m*, the second inner terminals 35*b*, 35*d*, 35*f*, 35*i*, 35*k*, and 35*m*, and the second outer terminal 7 are connected to each other, and therefore the shielding effect is further improved.

The multi-pole connector sets 100, 200, and 300 according to the first to Third Embodiments have been described above. However, the present disclosure is not limited to the above-described content and can be modified in various ways within the spirit of the disclosure.

For example, in the First to Third Embodiments, the first shield member is connected to the second inner terminals, but alternatively, the first shield member may be connected to the first inner terminals instead of or in addition to the second inner terminals.

A multi-pole connector set according to an embodiment of the present disclosure is described in the section "Means for Solving the Problem".

In the multi-pole connector set, a first shield member preferably includes a connection part, and the connection part preferably extends from the first shield member in a direction toward first inner terminals or second inner terminals. Alternatively, the second inner terminals preferably have connection parts and the connection parts preferably extend from the second inner terminals in a direction toward the first shield member.

In addition, it is preferable that the second connector have a rectangular shape that extends in a length direction, that the second connector further include a second outer terminal that is held by a second insulating member, that the second outer terminal include two side wall parts that extend in the length direction and face each other, that one or more of the second inner terminals be connected to the side wall parts, that the second inner terminals have connection parts, and that the connection parts extend in a direction toward the first shield member from the second inner terminals connected to the side wall parts. In this case, the first shield member, the second inner terminals, and the second outer terminal are connected to each other, and therefore the shielding effect is improved.

Furthermore, it is preferable that the first connector further include a first outer terminal that is held by a first insulating member, that the second connector further include a second outer terminal that is held by a second insulating member, and that the first shield member extend underneath the first outer terminal up to the second outer terminal. In this case, suppression of electromagnetic wave interference between inner terminals disposed in different rows is strengthened by the first shield member.

Furthermore, it is preferable that the second connector have second inner terminals that press against the first shield member from both sides in a direction in which the first inner terminals extend. In this case, the first shield member and the second inner terminals are reliably connected.

In addition, it is preferable that the second connector further include a second shield member that is located between rows of the second inner terminals and that the second shield member be connected to the first shield member. In this case, electromagnetic wave interference between inner terminals disposed in different rows is further suppressed.

In addition, it is preferable that the first inner terminals be male terminals and that the second inner terminals be female terminals. In this case, for example, when the connection parts are provided at the tips of the second inner terminals and the connection parts abut against and are connected to the first shield member, the connection parts abut against the first shield member with springiness so that the second inner terminals and the first shield member are well connected.

What is claimed is:

1. A multi-pole connector set comprising:

inner terminals of a first connector and a second connector configured to connect to each other, wherein the first connector includes first inner terminals disposed in an array having a plurality of rows, a first insulating member that holds the first inner terminals, and a first shield member that is located between the rows of the first inner terminals, and the second connector includes second inner terminals disposed in an array having a plurality of rows, and a second insulating member that holds the second inner terminals, connection parts are connected to and extend from the first shield member or the second inner terminals and configured to connect the first shield member to the first inner terminals or to the second inner terminals; and at least one of the connection parts directly connects the first shield member to the first inner terminal disposed in a middle of the array or to the second inner terminal disposed in a middle of the array.

2. The multi-pole connector set according to claim 1, wherein the first shield member includes the connection parts which extend in a direction toward the first inner terminals or the second inner terminals from the first shield member.

3. The multi-pole connector set according to claim 1, wherein the second inner terminals include the connection parts which extend in a direction toward the first shield member from the second inner terminals.

4. The multi-pole connector according to claim 1, wherein the second connector has a rectangular shape that extends in a length direction, the second connector further includes a second outer terminal that is held by the second insulating member, and the second outer terminal has two side wall parts that extend in the length direction and face each other, one or more of the second inner terminals are connected to the side wall parts, the second inner terminals have the connection parts, and the connection parts extend in a direction toward the first shield member from the one or more second inner terminals connected to the side wall parts.

5. The multi-pole connector set according to claim 1, wherein the first connector further includes a first outer terminal that is held by the first insulating member, the second connector further includes a second outer terminal that is held by the second insulating member, and the first shield member extends underneath the first outer terminal to the second outer terminal.

6. The multi-pole connector set according to claim 1, wherein the second connector has second inner terminals that press the first shield member from both sides in a direction in which the first inner terminals extend.

7. The multi-pole connector according to claim 1, wherein the second connector further includes a second shield member that is located between the rows of the second inner terminals, and the second shield member is configured to connect to the first shield member.

8. The multi-pole connector set according to claim 1, wherein the first inner terminals are male terminals and the second inner terminals are female terminals.

9. The multi-pole connector set according to claim 2, wherein the first connector further includes a first outer terminal that is held by the first insulating member, the second connector further includes a second outer terminal that is held by the second insulating member, and the first shield member extends underneath the first outer terminal to the second outer terminal.

10. The multi-pole connector set according to claim 3, wherein the first connector further includes a first outer terminal that is held by the first insulating member, the second connector further includes a second outer terminal that is held by the second insulating member, and the first shield member extends underneath the first outer terminal to the second outer terminal.

11. The multi-pole connector set according to claim 4, wherein the first connector further includes a first outer terminal that is held by the first insulating member, the second connector further includes a second outer terminal that is held by the second insulating member, and the first shield member extends underneath the first outer terminal to the second outer terminal.

12. The multi-pole connector set according to claim 2, wherein the second connector has second inner terminals that press the first shield member from both sides in a direction in which the first inner terminals extend.

13. The multi-pole connector set according to claim 3, wherein the second connector has second inner terminals that press the first shield member from both sides in a direction in which the first inner terminals extend.

14. The multi-pole connector set according to claim 4, wherein the second connector has second inner terminals that press the first shield member from both sides in a direction in which the first inner terminals extend.

15. The multi-pole connector according to claim 2, wherein the second connector further includes a second shield member that is located between the rows of the second inner terminals, and the second shield member is configured to connect to the first shield member.

16. The multi-pole connector according to claim 3, wherein the second connector further includes a second shield member that is located between the rows of the second inner terminals, and the second shield member is configured to connect to the first shield member.

17. The multi-pole connector according to claim 4, wherein the second connector further includes a second shield member that is located between the rows of the second inner terminals, and the second shield member is configured to connect to the first shield member.

18. The multi-pole connector set according to claim 2, wherein the first inner terminals are male terminals and the second inner terminals are female terminals.

19. The multi-pole connector set according to claim 3, wherein the first inner terminals are male terminals and the second inner terminals are female terminals.

20. The multi-pole connector set according to claim 4, wherein the first inner terminals are male terminals and the second inner terminals are female terminals.

* * * * *